United States Patent
Schwärzler (10) Patent No.: US 6,306,044 B1
(45) Date of Patent: Oct. 23, 2001

(54) HOMOCINETIC BALL-AND-SOCKET JOINT WITH OPTIMIZED ROLL ERROR

(75) Inventor: Peter Schwärzler, Glattbach (DE)

(73) Assignee: GKN Löbro GmbH (DE)

( * ) Notice: Subject to any disclaimer, the term of this patent is extended or adjusted under 35 U.S.C. 154(b) by 0 days.

(21) Appl. No.: 09/242,501

(22) PCT Filed: Jul. 5, 1997

(86) PCT No.: PCT/EP97/03559

§ 371 Date: Jun. 17, 1999

§ 102(e) Date: Jun. 17, 1999

(87) PCT Pub. No.: WO98/08000

PCT Pub. Date: Feb. 26, 1998

(30) Foreign Application Priority Data

Aug. 17, 1996 (DE) ............................................. 196 33 166

(51) Int. Cl.[7] ........................................................... F16D 3/16
(52) U.S. Cl. .......................... 464/145; 464/139; 464/141
(58) Field of Search ............................... 464/139, 141, 464/143, 145, 906

(56) References Cited

U.S. PATENT DOCUMENTS

| | | | |
|---|---|---|---|
| 2,128,088 | * 8/1938 | Hanft | 464/143 |
| 3,263,448 | * 8/1966 | Adams | 464/145 |
| 4,820,240 | * 4/1989 | Girguis | 464/145 |
| 4,915,672 | * 4/1990 | Girguis | 464/145 |
| 5,782,696 | * 7/1998 | Buimbretiere | 464/145 |

FOREIGN PATENT DOCUMENTS

| | | |
|---|---|---|
| AS 22 52 827 | 5/1975 | (DE) . |
| 39 39 531 C1 | 6/1991 | (DE) . |
| 0076324 | * 5/1982 | (JP) ................................. 464/145 |

OTHER PUBLICATIONS

"Gelenke und Gelenkwellen", Springer–Verlag 1988, pp. 36/37.

* cited by examiner

*Primary Examiner*—Lynne H. Browne
*Assistant Examiner*—Aaron M Dunwoody

(57) ABSTRACT

A constant velocity universal ball joint of the fixed joint type, having an outer joint part with curved outer ball tracks extending longitudinally inside, having an inner joint part with curved inner ball tracks extending longitudinally outside, having a plurality of torque transmitting balls which are each guided in outer and inner ball tracks associated with one another, having a ball cage with a plurality of cage windows respectively receiving the balls, wherein the tangential planes at the points of contact of the balls with the outer and inner ball tracks—which points of contact are required for torque transmitting purposes—define a spatial control angle 2K and wherein the superposition of the momentary local relative speeds between the balls and the outer and the inner ball tracks in the points of contact defines the rolling error Δv, with the tracks being designed in such a way that when the joint is articulated, mininum control angles K coincide with regions of minimum rolling errors Δv.

16 Claims, 12 Drawing Sheets

HOMOCINETIC BALL-AND-SOCKET JOINT WITH OPTIMIZED ROLL ERROR

BACKGROUND OF THE INVENTION

The invention relates to a constant velocity universal ball joint of the fixed joint type, having an outer joint part with curved outer ball tracks extending longitudinally inside, having an inner joint part with curved inner ball tracks extending longitudinally outside, having a plurality of torque transmitting balls which are each guided in outer and inner ball tracks associated with one another, having a ball cage with a plurality of cage windows respectively receiving the balls, wherein the tangential planes at the points of contact of the balls with the outer and inner ball tracks—which points of contact are required for torque transmitting purposes—define a spatial control angle 2K and wherein the superposition of the momentary local relative speeds in the points of contact between the balls and the outer and inner ball tracks defines the rolling error $\Delta v$.

Previously known and produced constant velocity universal ball joints have a load bearing capacity which is greatly reduced at large articulation angles. In some instances, such joints generate a scratching noise at large articulation angles. Said noise is attributed to sliding movements between the balls and the ball tracks, which sliding movements are caused by the rolling error existing in each constant velocity ball joint. It has to be taken into account that the loads on individual balls and the rolling error of the balls vary considerably during one rotation of the joint and that the highest ball loads acting as normal forces occur approximately in the points of minimum control angles where at the same time large rolling errors occur. In consequence, there occur high sliding percentages in the contact points under high normal forces and thus a high friction energy loss. A high degree of wear, high temperatures and a tendency for scratching noises to occur constitute further disadvantages.

The rolling error $\Delta v$ can be regarded as being the momentary speed component of the movement of a ball centre, with which speed component the ball would leave the cage plane if it were not held back by the cage and if no sliding would occur in the ball contact points with the ball tracks of the outer joint part and the inner joint part (ball hub).

When the CV joints are in an articulated condition, the balls, as a result of the rolling error $\Delta v$, usually have the tendency to leave the cage plane. This tendency has to be counteracted by the cage in that it displaces the balls against their rolling tendency relative to the ball tracks.

Without the function of the cage, the balls would remain in the angle-bisecting plane only if the rolling error $\Delta v$ equals 0. Under the latter condition, the ball would roll in its two contact points, and though would remain on its position in the cage plane.

The rolling error $\Delta v$ depends on the respective phase angle $\theta$ of a ball with reference to the joint articulation plane extending through the axes of the joint components.

The rolling condition of $\Delta v$ equalling 0 under which the balls remain in the cage plane of their own accord, during one joint rotation, is met by each ball only in two phase positions.

At all the other phase angles the cage has to hold the balls in the cage plane, with the balls sliding in the points of contact with the ball tracks.

The course taken by the supporting forces acting on the balls also changes as a function of the phase angle $\theta$. Said supporting forces are the normal forces acting on the balls at the contact angle $\delta$.

The disadvantage of the prior art joints is that in the regions with high supporting forces there exists a considerable rolling error. High rolling errors, i.e. high sliding percentages combined with high supporting forces result in high friction and thus a high degree of wear, but also in high inner joint forces which reduce the maximum load bearing capacity of the joint, especially of the cage.

BRIEF SUMMARY OF THE INVENTION

In view of the above, it is the object of the invention to provide constant velocity universal ball joints of the fixed joint type which are characterised by reduced friction forces under articulated conditions and thus by reduced wear and a higher torque transmitting capacity.

In accordance with the invention it is proposed that the tracks are designed in such a way that, when the joint is articulated, minimum control angles coincide with regions of minimum rolling errors. Advantageous designs and further embodiments are described in the sub-claims whose contents are herewith referred to.

By arranging regions of small spatial control angles in the regions of small rolling errors, high supporting forces which are generated at small spatial control angles are made to occur during periods of almost pure rolling movements of the balls.

BRIEF DESCRIPTION OF THE DRAWINGS

Preferred embodiments of the solution in accordance with the invention will be described below with reference to the state of the art and the drawings wherein

FIG. 9 gives characteristic values of a ball of an inventive joint according to FIG. 3, i.e.

a) the spatial control angle K
b) the rolling error Δv
in each case as a function of the phase angle θ.

DETAILED DESCRIPTION OF THE INVENTION

The two illustrations of FIG. 1 will be described jointly below. The constant velocity universal ball joint comprises an outer joint part 11, an inner joint part 12, also referred to as the ball hub, a ball cage 13 with cage windows 14, as well as balls 15 held in the cage windows. The balls engage outer ball tracks 21 in the outer joint part and inner ball tracks 22 in the inner joint part. In view A, the balls are undercut-free, so that the joint is referred to as a UF joint. The outer spherical face 23 of the cage is guided in an inner spherical face 24 of the outer joint part 11, so that the joint constitutes a fixed joint which pivots around a fixed joint centre M. Similarly, the spherical outer face 25 of the inner joint part is guided in an inner spherical face 26 of the ball cage. A toothed journal 27 is attached to the outer joint part 11. The inner joint part 12 has a toothed inner aperture 28 for inserting a shaft.

Figure 2A:
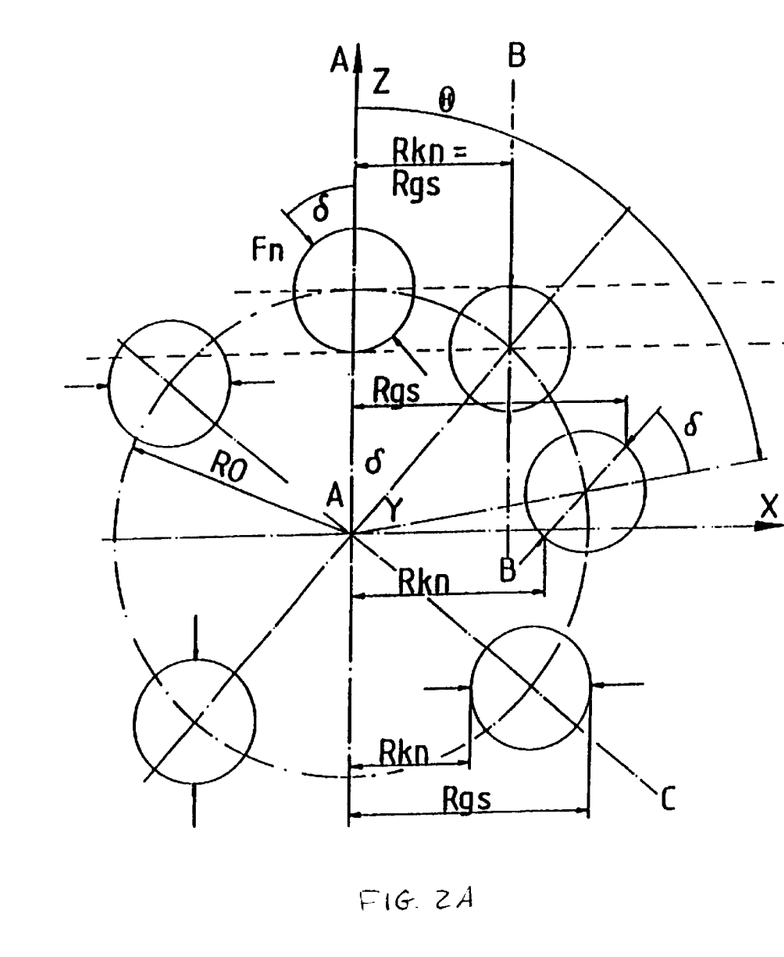
FIG. 2 shows balls of a joint of said species according to FIG. 1 in different phase positions
 a) in an axial view of the joint
 b) in the form of a longitudinal section through the joint.
Figure 2B:
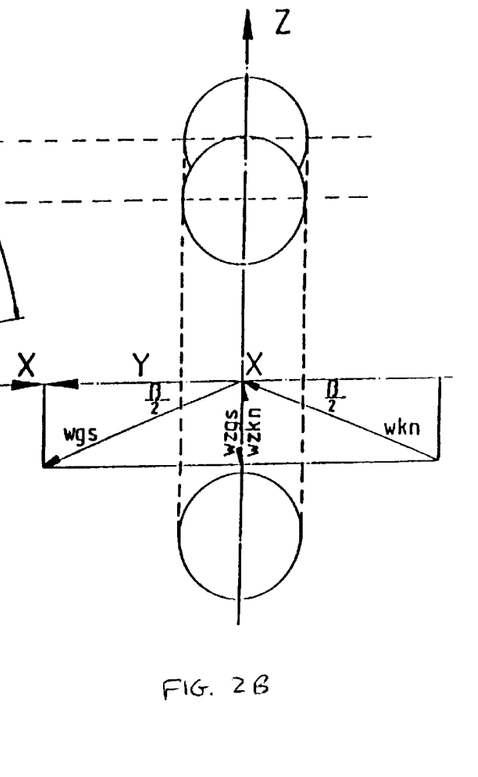

FIG. 2 shows balls (not referred to in greater detail) in different phase positions which are described by the phase angle θ, starting from an assumed joint articulation plane XZ. The balls shown are not associated with one another in any particular way, i.e. the balls do not represent the multiplicity of joint balls in positions true to their functions and as determined by the cage, but one ball is shown in different phase positions on an approximately circular track, with the joint rotating in an articulated condition. The common ball plane XZ determined by the central plane of the ball cage, on the left, is represented by the drawing plane and, on the right, it extends perpendicularly relative to the drawing plane. Relative to said plane XZ, the two other joint parts, i.e. the outer joint part and the inner joint part, are articulated by angles of equal size and extending in opposite directions, said angles having the size of half the articulation angle.

The rolling error of constant velocity universal joints will be described below with reference to FIG. 2, with the term joint piece also being used for the outer joint part, with the term ball hub also being used for the inner joint part and, furthermore, with the following symbols being used:

Δv—rolling error
$v_{kn}$—momentary speed component in the point of contact between the ball hub and a ball
$v_{gs}$—momentary speed component in the point of contact between the outer joint part and a ball
$R_o$—radius of rolling circle of balls
$R_{kn}$—radius from the joint articulation plane to the point of contact between a ball and the ball hub
$R_{gs}$—radius from joint articulation plane to the point of contact between a ball and the outer joint part
$\omega_{kn}$—angular speed of ball hub
$\omega_{gs}$—angular speed of outer joint part
$\omega_{zgs}$—vertical component of angular speed of outer joint part
$\omega_{zkn}$—vertical component of angular speed of ball hub
θ—phase angle of a ball with reference to articulation plane
δ—pressure angle of the supporting forces acting on a ball.

In FIG. 2, the reference system XYZ is determined by the cage plane XZ and the cage axis Y. The plane XZ is the angle-bisecting plane between the axes of the outer joint part and the ball hub, in which plane the balls of a constant velocity universal joint are to be held. The plane YZ is the joint articulation plane, i.e. the plane extending between the axes of the outer joint part and ball hub. The pairs of vectors shown at the balls at the angle δ are the supporting forces or normal forces $F_n$ in the points of contact. The vector diagram shows the axes of rotation and the respective momentary rotary movements. The rolling error Δv may be regarded as the momentary speed component of the movement of a ball centre, with which speed component a ball would leave the cage plane if no sliding movement occurred in the points of contact of the ball with the ball tracks of the outer joint part and of the ball hub respectively: $\Delta v = \frac{1}{2}(v_{kn}+v_{gs})$.

The rolling error Δv is dependent on the respective phase angle θ of a ball with reference to its position relative to the joint articulation plane YZ determined by the axes of the joint components. The condition under which the balls remain in the cage plane of their own accord is that the rolling error Δv 0.

This is the case if the following condition is met:

$$\Delta v = 0 = v_{kn} + v_{gs}$$

$v_{kn}$ is the momentary speed component in the point of contact between the ball hub and a ball, extending perpendicularly to the cage plane, with $v_{gs}$ being the momentary speed component in the point of contact between the outer joint part and a ball, extending perpendicularly to the cage plane. Only if these speeds are identical in respect of magnitude and operate in opposite directions (does the rolling error Δv equal zero).

In consequence, the following has to apply:

$$0 = R_{kn} \times \omega_{zkn} + R_{gs} \times \omega_{zgs}.$$

This condition is met for $R_{kn}=R_{gs}$. In the course of one joint rotation, this condition is met in two phase positions only.

Figure 3A:
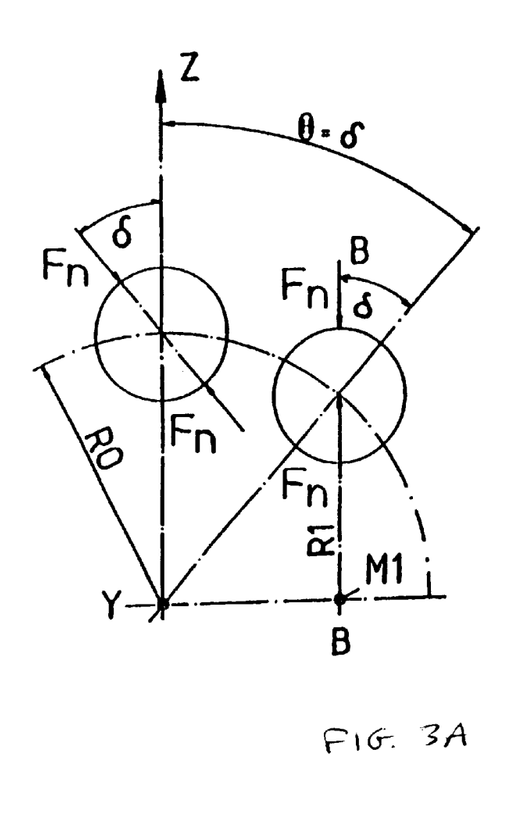
FIG. 3 shows a first track embodiment of a joint in accordance with the invention with the tracks extending asymmetrically
 a) in an axial view of the joint
 b) in the form of a longitudinal section through the joint.
Figure 3B:
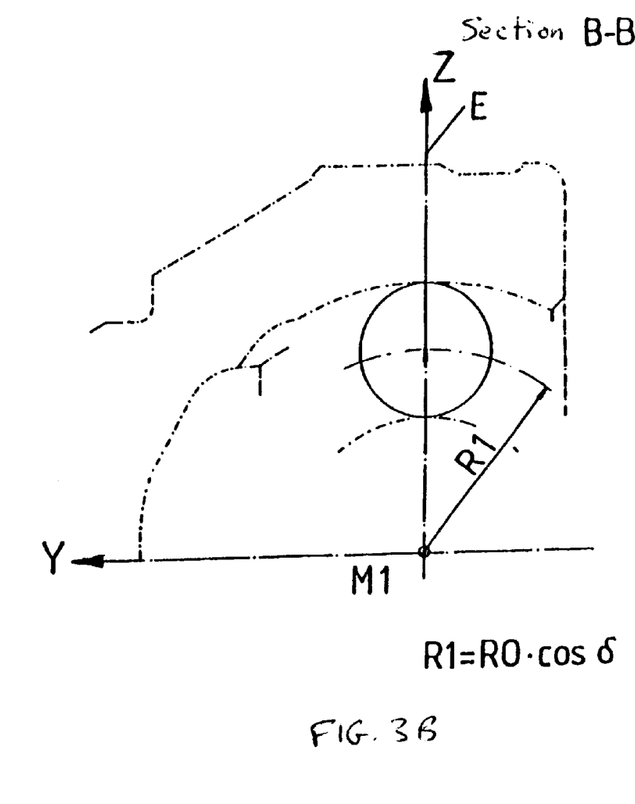

FIG. 3, on the left, shows the position of the ball in a cross-section through the joint in accordance with the invention and, on the right, in a longitudinal section through a corresponding inventive joint according to plain BB which is also shown in FIG. 2 in parallel to the joint articulation plane YZ. It is possible to see a radial axis YZ through the centre of the joint, which, below, serves as a reference plane. In the axis Z, there is positioned a first ball which is acted upon by the supporting forces at a contact angle δ. At an angle θ which corresponds to the contact angle δ there is entered a ray. If a ball is in this position, the normal forces $F_n$ in the ball contact points act parallel to the plane YZ, with the ball centre being located at the point of intersection between said ray and the rolling circle of diameter $R_o$. The plane BB is determined by said ball centre and parallel to the reference plane YZ.

As can be seen on the right in the section, said plane BB defines and contains the circular centre lines of the ball tracks in the outer joint part and in the inner joint part with the radius of curvature $R_1$ around a common centre $M_1$ which is located on the axis X of the rolling circle and in the plane BB. The tracks shown in the section BB are shown to be real, i.e. with reference to a longitudinal section through the joint axes, the tracks in the inner joint part and in the outer joint part extend in an offset plane.

Due to said track course, the normal forces in these regions occur both in the plane BB (rolling error $\Delta v=0$) and in the plane XY (control angle K=0), i.e. the conditions of rolling error $\Delta v=0$ and control angle K=0 coincide, which is taken advantage of by the invention to ensure that in those regions where there occur high normal forces (small control angles), there are also small rolling errors.

Because of the coinciding positions of the centres of the radii of curvature when the joint is in the aligned condition, the track shown in a section through BB does not generate any control forces and thus has no centring effect on the cage, so that improvements are possible in that respect.

Figure 4:
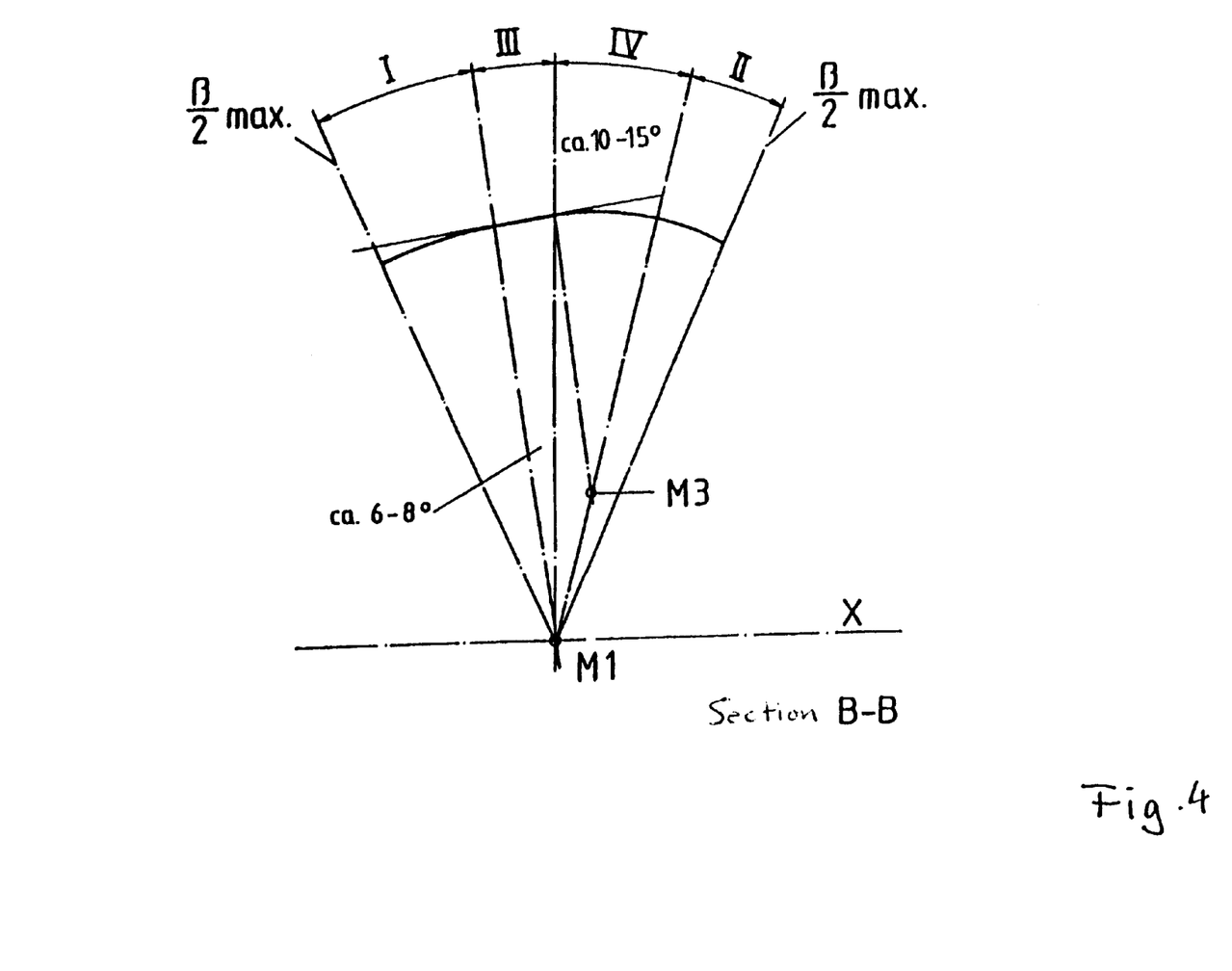
FIG. 4 shows a modification of the course taken by the tracks according to FIG. 3 in the form of a longitudinal section.

FIG. 4 shows a track course which is modified relative to that of FIG. 3 and which can be transferred into the plane BB of FIG. 3. There are shown four different curve portions with two different centres which should be understood as follows:

I—a circular arch around $M_1$

III—a tangentially adjoining straight line at an angle of approx. 6 to 8 degrees relative to the Y-direction IV—a circular arch around $M_3$, which tangentially adjoins III II—a circular arch around $M_1$, which tangentially adjoins IV.

This arrangement ensures that the condition in accordance with the invention, i.e. small rolling errors at high normal forces, is met at least at large articulation angles. This is important to the extent that with increasing articulation angles, the normal force maxima also increase.

Figure 5A:
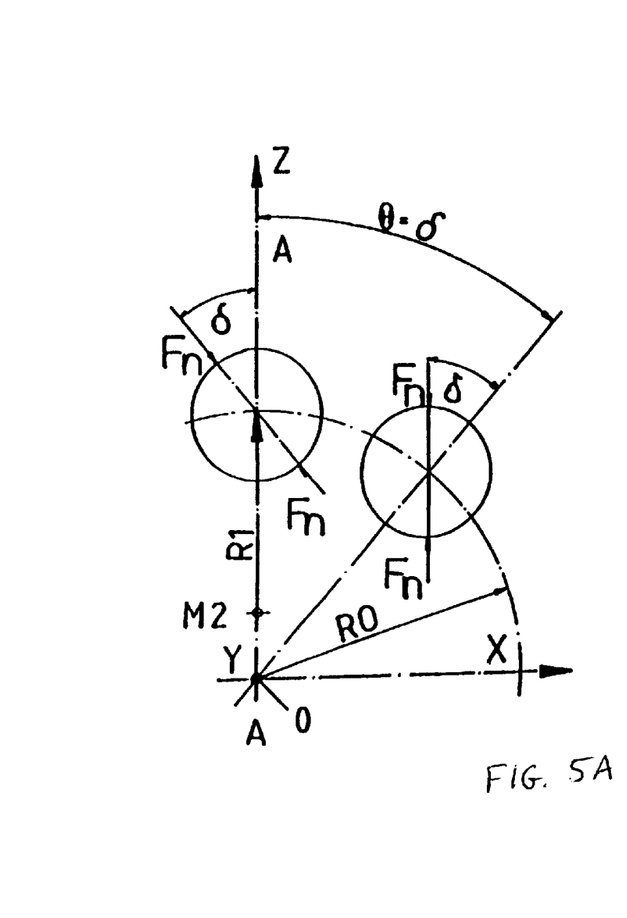
FIG. 5 shows a second track embodiment of a joint in accordance with the invention, having tracks with a close curvature
 a) in an axial view of the joint
 b) in the form of a longitudinal section through the joint
Figure 5B:
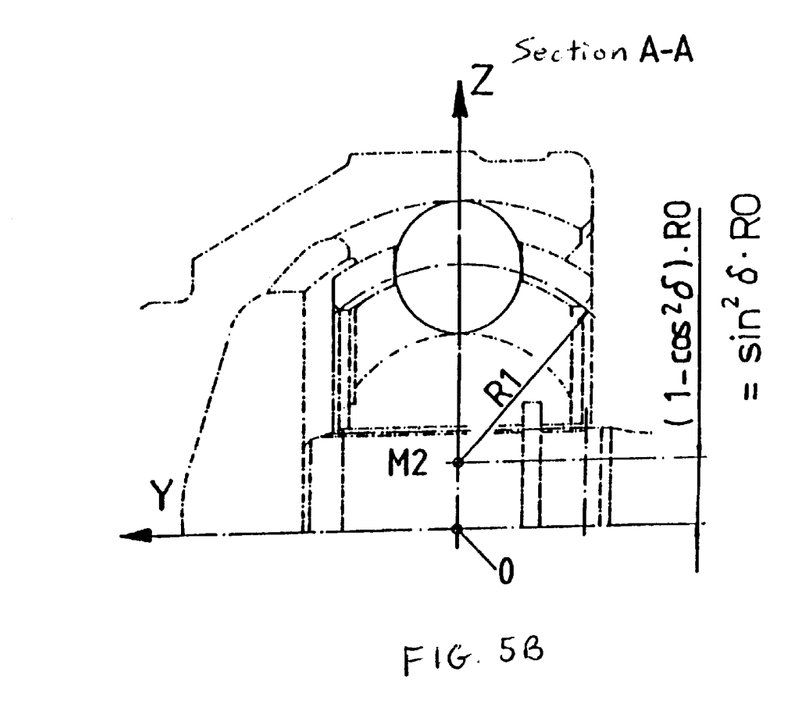

FIG. 5, on the left, shows the ball assembly of an inventive joint in a partial cross-section with two ball positions and, on the right, the respective inventive joint in a longitudinal section through the plane AA. There is shown a first radial plane Z in which a ball is positioned first. The supporting forces at the balls are shown at a contact angle δ. A ray determining a second ball position is shown at a phase angle θ=δ. As also shown in FIG. 2, the plane YZ at the same time constitutes the sectional plane AA illustrated on the right. In said plane, which is shown correctly, the centre lines of the tracks are located in the outer joint part and in the inner joint part, which comprise the radius of curvature $R_1$ around a common centre $M_2$ which is located in the plane AA, but at a distance from the longitudinal central axis Y of the joint. The distance of the centre $M_2$ from the axis amounts to $(\sin^2 \delta) R_o$, with $R_o$ being the rolling circle diameter; the radius $R_1$ itself, accordingly, amounts to $R_o \cos^2 \delta$. By reducing the size of the radii, the speed differentials between the points of contact of the ball hub and outer joint part with the ball are reduced in the region of high active forces, whereas in the region of lower active forces, greater rolling errors can occur.

Because of the coinciding positions of the centres of the radii of curvature at small joint articulation angles, the ball tracks in the plane AA do not generate any control forces acting on the ball and thus do not apply any returning forces to the cage. In consequence, improvements regarding the control of the cage are possible.

Figure 6:
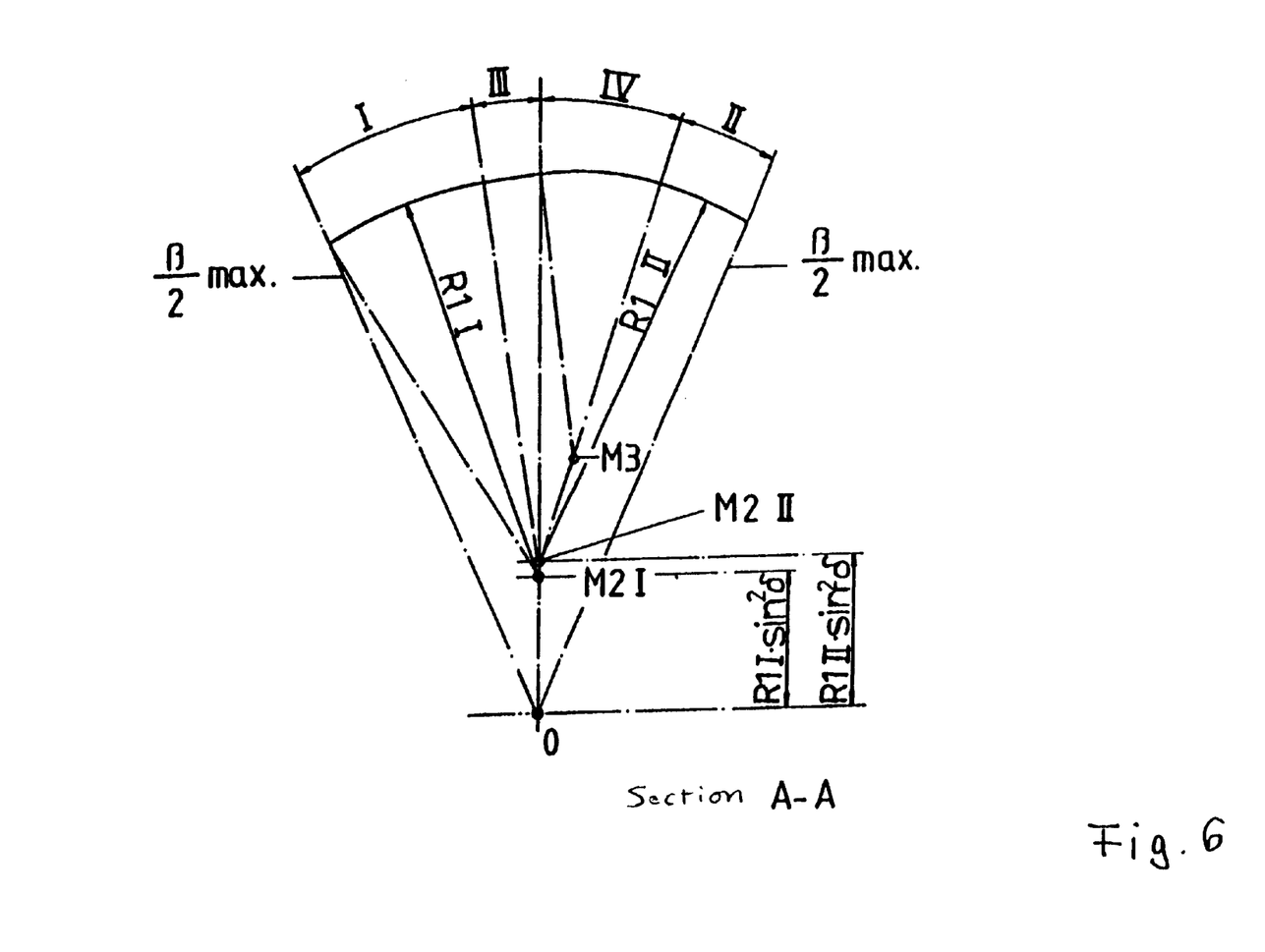
FIG. 6 shows a modification of the course taken by the tracks according to FIG. 5 in the form of a longitudinal section.

FIG. 6 shows a track course which differs from that shown in FIG. 5 and can be transferred into the plane AA of FIG. 5. The track course covers four regions which can be described as follows:

I—a circular arch around the centre $M_{2I}$

III—a straight line at an angle of approx. 6 to 8 degrees relative to the Y-axis, tangentially adjoining I IV—a circular arch around $M_3$, tangentially adjoining III II—A circular arch around $M_{2II}$, tangentially adjoining IV.

The distance of the joint centre $M_{2I}$ from the longitudinal joint axis amounts to $R_{1I} \sin^2 \delta$ and the distance of the centre $M_{2II}$ from the longitudinal joint axis amounts to $R_{1II} \sin^2 \delta$.

Figure 7:
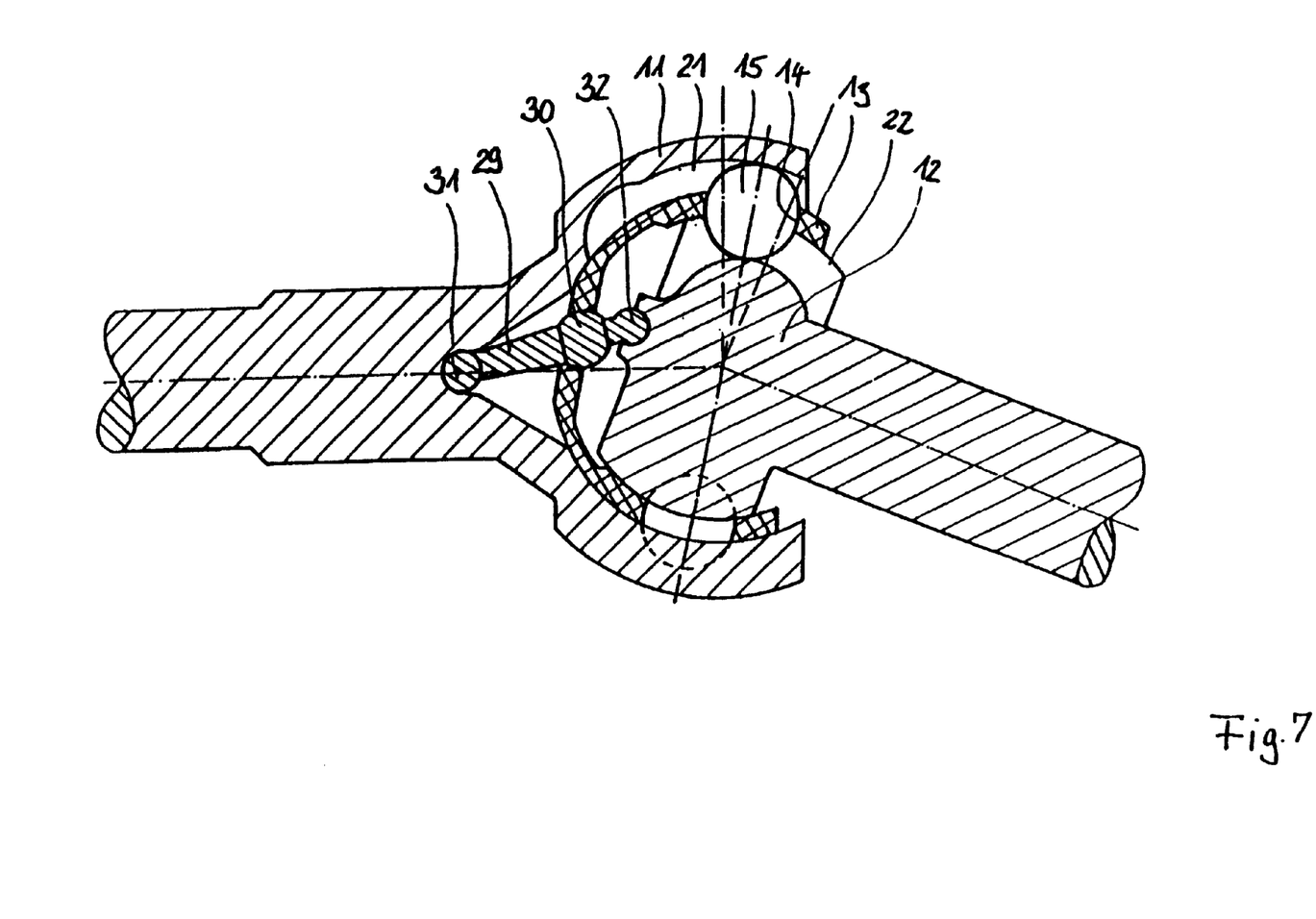
FIG. 7 shows an embodiment of a joint with tracks extending as illustrated in FIGS. 3 and 5.

FIG. 7 shows an embodiment of a joint control system which could be transferred to the joint embodiments according to FIGS. 3 and 5. Reference numbers have only been given to the cage 13, the ball hub 12 and the outer joint part 11 as well as to a pilot lever 29 which is provided with a ball-joint-like articulation point 32 in the ball hub 12 and a ball-joint-like articulation point 31 in the outer joint part 11, both times in the axial position, which pilot lever 29 is further provided with a control head 30 which co-operates with the cage 13 and, at small joint articulation angles, guides same securely into the angle-bisecting position between the axes $A_1, A_2$ of the ball hub 12 and the outer joint part 11 respectively.

Figure 1A:
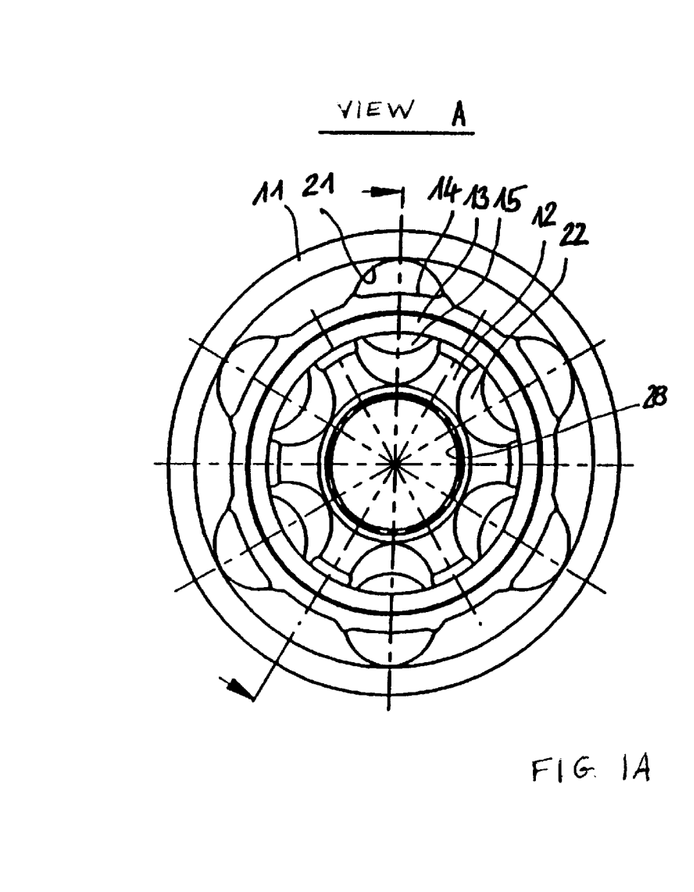
FIG. 1 shows a prior art constant velocity universal ball joint of the fixed joint type
 a) in an axial view
 b) in the form of a longitudinal section.
Figure 1B:
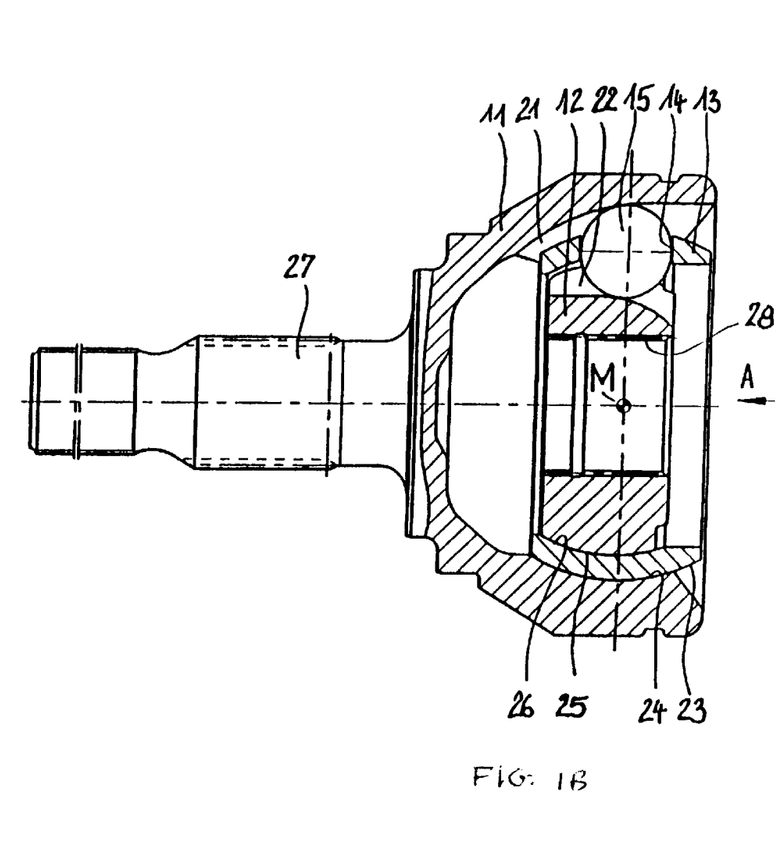
Figure 8:
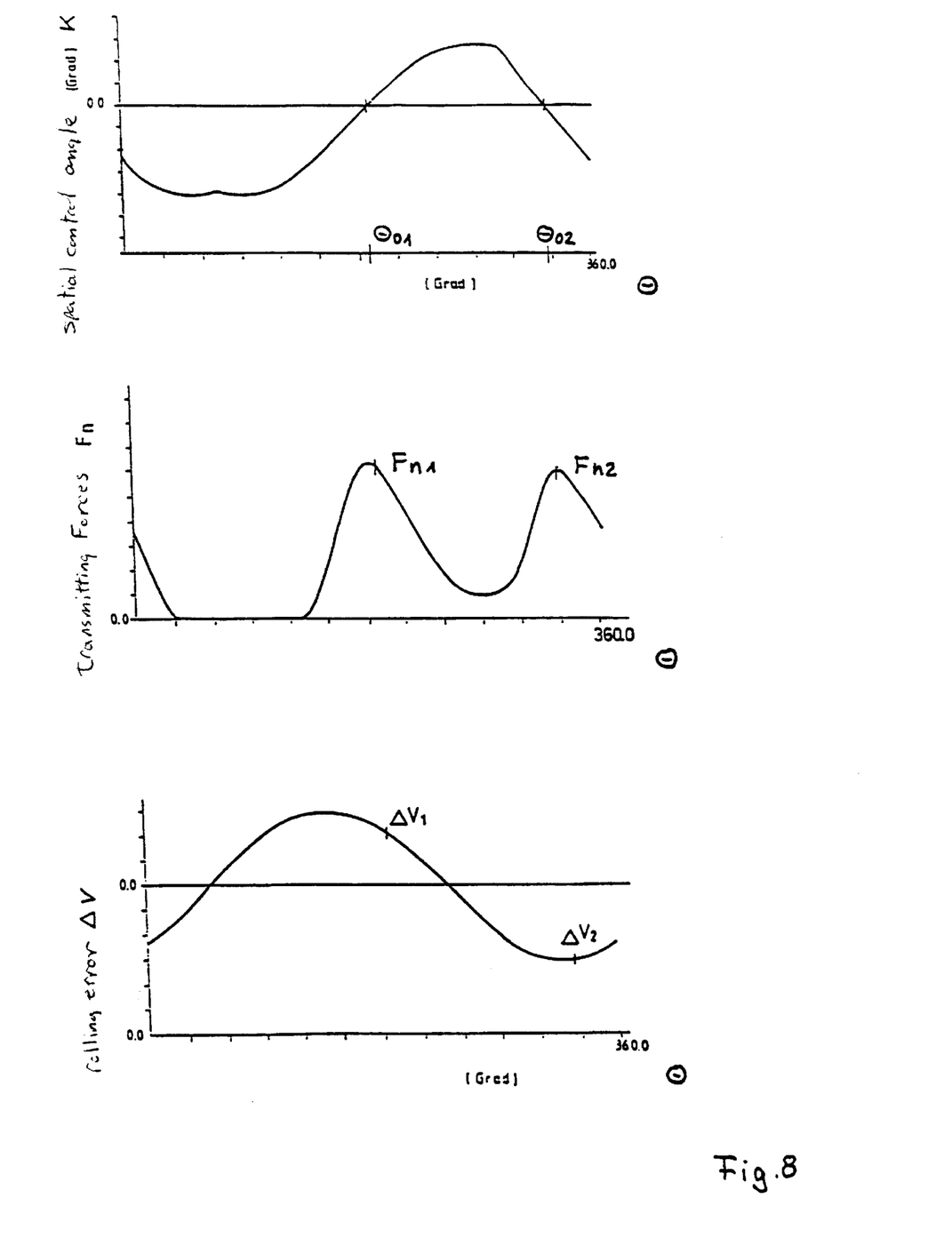
FIG. 8 gives characteristic values of a joint of said species according to the state of the art in an articulated condition, as a function of the phase angle, i.e.
 a) the spatial control angle K
 b) transmitting forces $F_n$
 c) the rolling error $\Delta v$
in each case as a function of the phase angle $\theta$.

FIG. 8 shows various characteristic values at a ball for a joint of said species in accordance with the state of the art, for example as shown in FIG. 1, with the angle described as the rotary joint angle θ corresponding to the phase angle θ according to FIG. 2. The spatial control angle K shown at the top has two zero crossings on the rotation of a ball of 360 degrees when the joint is articulated. The phase angles $\theta_{01}$, $\theta_{02}$ defined in this way are given in the illustration of the control angle and in the two further illustrations. In the centre, there are shown the supporting forces at the ball which, in this case, are referred to as transmitting forces $F_n$ and which comprise two maxima and two minima. It can be seen that the maximum transmitting forces $F_n$ are located near the phase angles $\theta_{01}$ and $\theta_{02}$. This means that at said phase angles, the transmitting forces $F_{n1}$ and $F_{n2}$ are very high.

In the lower illustration, the rolling error $\Delta v$ is shown as a function of the phase angle which has two zero crossings on the rotation of the balls. Special reference has been made to the rolling errors $\Delta_{v1}, \Delta_{v2}$ at the phase angles $\theta_{01}, \theta_{02}$ which clearly deviate from zero or are close to a maximum. When looking at the two other illustrations it can be seen that, especially at high supporting forces $F_n$, the rolling error $\Delta v$ deviates considerably from zero.

Figure 9:
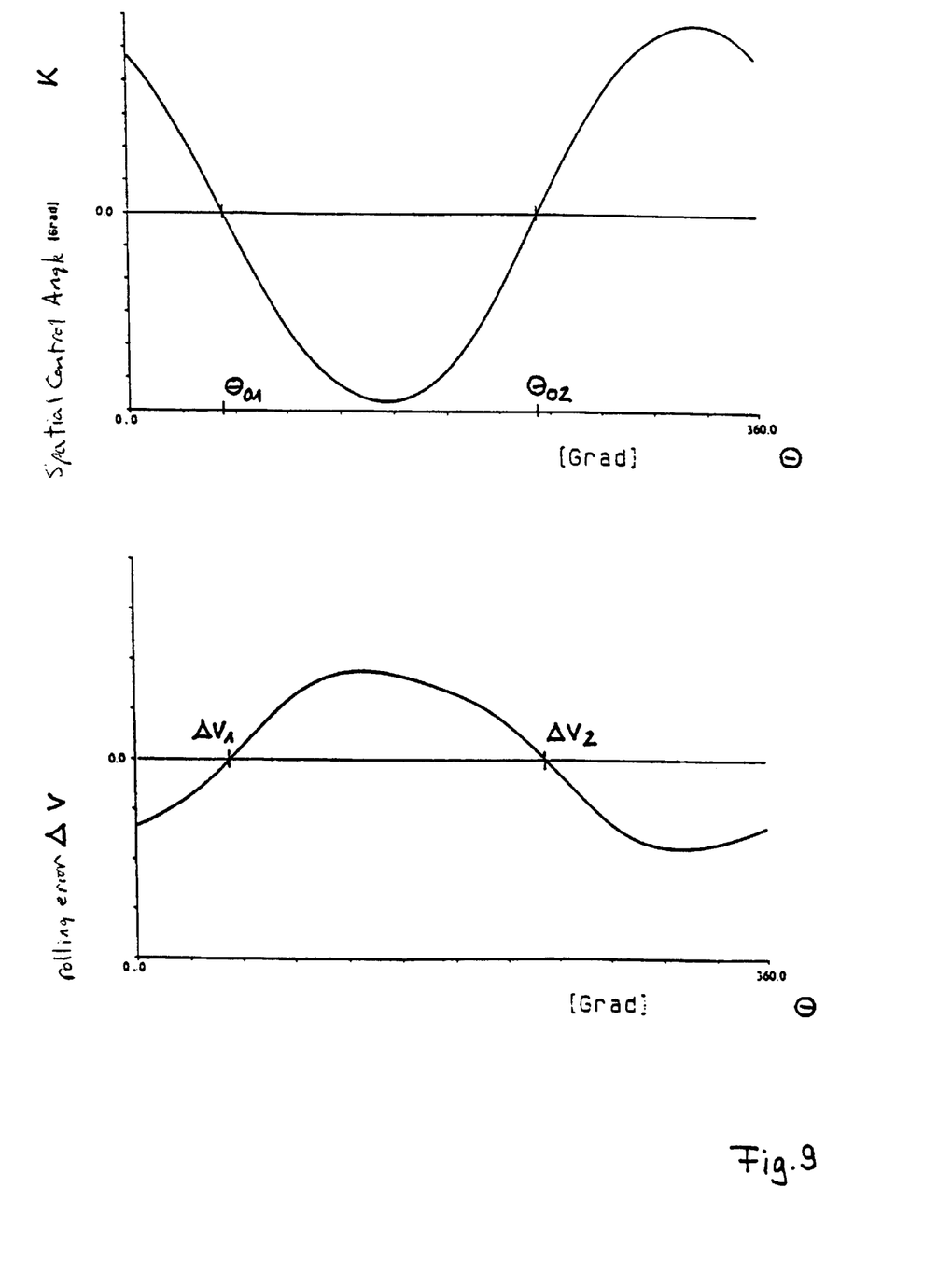
Figure 10:
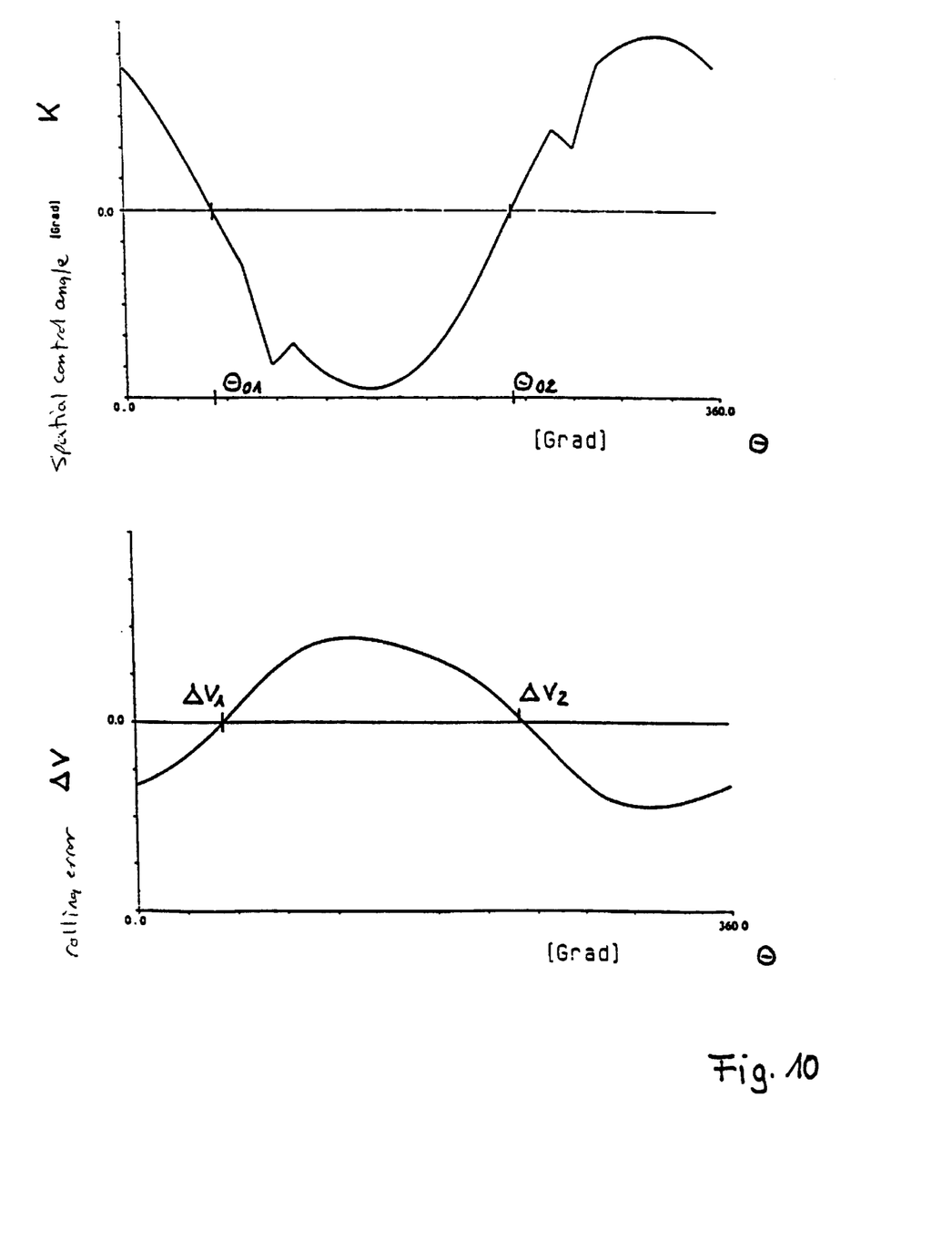
FIG. 10 gives characteristic values of a ball of an inventive joint according to FIG. 4, i.e.
a) the spatial control angle K
b) the rolling error Δv,
in each case as a function of the phase angle θ.
Figure 11:
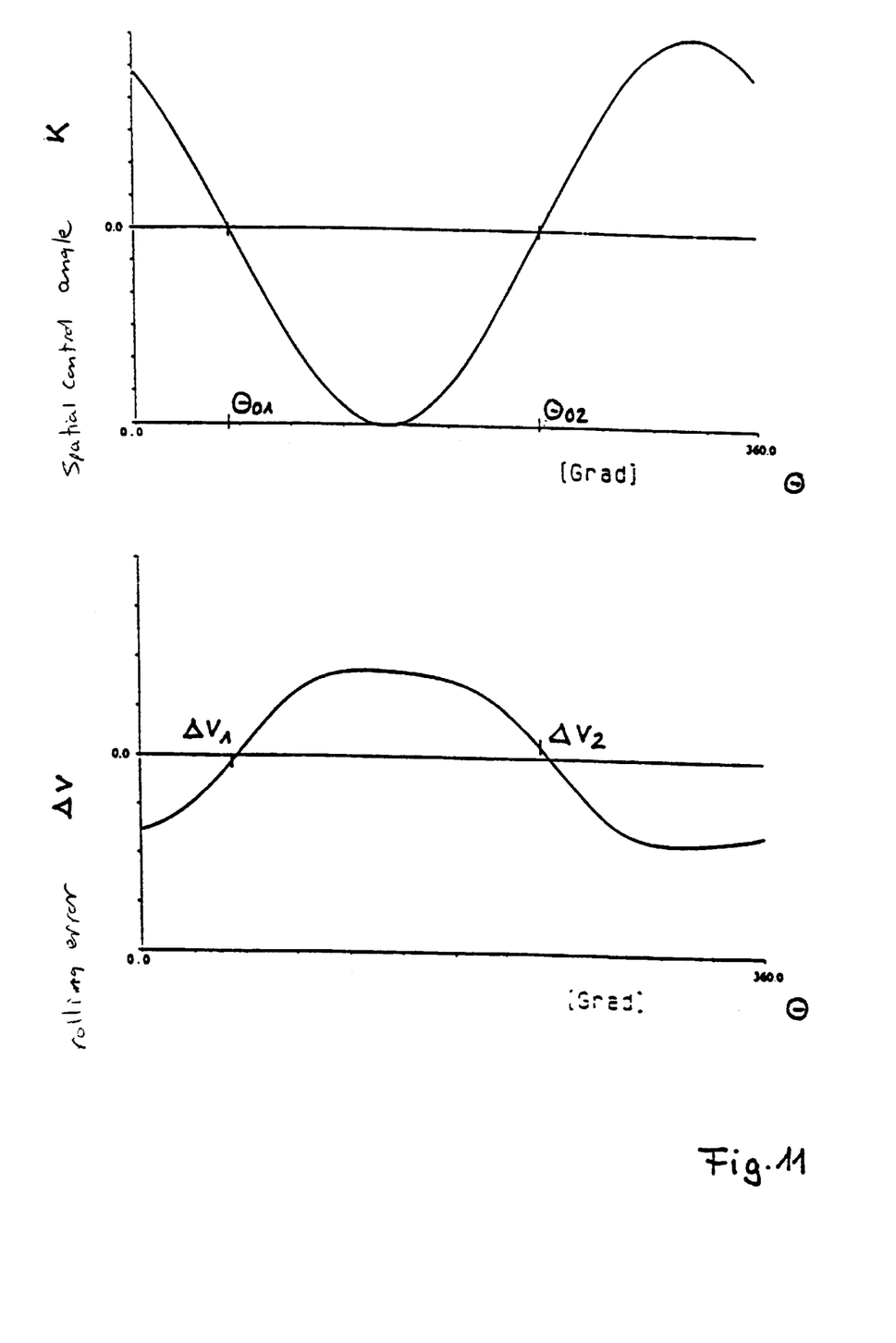
FIG. 11 gives characteristic values of a ball of an inventive joint according to FIG. 5, i.e.
a) the spatial control angle K,
b) the rolling error Δv,
in each case as a function of the phase angle θ.
Figure 12:
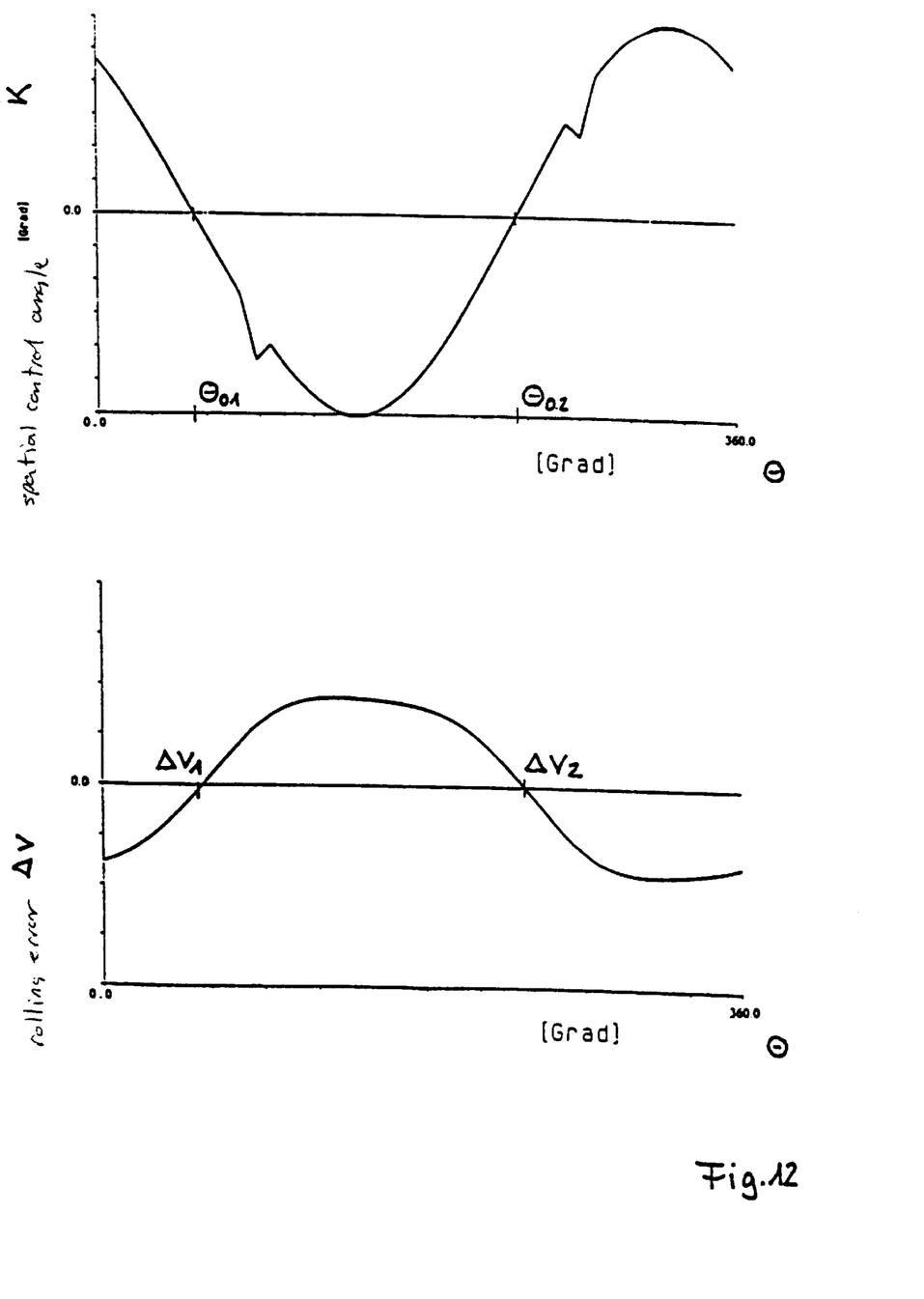
FIG. 12 gives characteristic values of a ball of an inventive joint according to FIG. 6, i.e.
a) the spatial control angle K
b) the rolling error Δv,
in each case as a function of the phase angle θ.

FIGS. 9 to 12 show two ball parameters each, which are known from FIG. 8, for a joint in accordance with the invention. FIG. 9 shows the conditions prevailing on a joint according to FIG. 3, FIG. 10 the conditions prevailing at a joint according to FIG. 4, FIG. 11 the conditions prevailing at a joint according to FIG. 5, and FIG. 12 the conditions prevailing at a joint according to FIG. 6. The zero crossings of the spatial control angle K have been made to coincide approximately with the zero crossings of the rolling error $\Delta v$. In view of the fact that, at the spatial control angle K=0, the transmitting forces $F_n$ have reached approximately their maximum, the maxima of the transmitting forces advantageously coincide with minimum rolling errors $\Delta v$. The irregularities in the spatial control angle of the joints according to FIGS. 10 and 12, as in the joints according to FIGS. 4 and 6, result from the composite curves of the tracks. By approximating said curve course, e.g. by means of a polynomial approximation, it is possible to eliminate said irregularities.

What is claimed is:

1. A constant velocity universal ball joint of the fixed joint type, comprising:
an outer joint part with curved outer ball tracks extending longitudinally inside,
an inner joint part with curved inner ball tracks extending longitudinally outside,
a plurality of torque transmitting balls which are each guided in outer and inner ball tracks associated with one another,
a ball cage with a plurality of cage windows respectively receiving said balls, wherein the tangential planes at points of contact of said balls with said outer and inner ball tracks, said points of contact for torque transmitting purposes define a spatial control angle (K) and wherein the superposition of the momentary local relative speeds in said points of contact between said balls and said outer and inner ball tracks defines a rolling error ($\Delta v$) and said tracks are designed such that when the joint is in an articulated condition, minimum control angles (K) coincide with regions of minimum rolling errors ($\Delta v$).

2. A constant velocity universal ball joint of the fixed joint type, comprising:
an outer joint part with curved outer ball tracks extending longitudinally inside,
an inner joint part with curved inner ball tracks extending longitudinally outside,
a plurality of torque transmitting balls which are each guided in outer and inner ball tracks associated with one another,
a ball cage with a plurality of cage windows respectively receiving said balls, wherein the tangential planes at points of contact of said balls with said outer and inner ball tracks—said points of contact serving torque transmitting purposes—define a spatial angle (K) and wherein the superposition of the momentary local relative speeds in said points of contact between said balls and said outer and inner ball tracks defines a rolling error ($\Delta v$), said tracks are designed such that when the joint is in an articulated condition, minimum control angles (K) coincide with regions of minimum rolling errors ($\Delta v$), and
wherein when the joint is in an, aligned condition, the center lines of outer and inner ball tracks associated with one another are each positioned in planes (BB) which, in a corresponding circumferential sense, are offset parallel relative to radial reference planes (YZ) through coinciding central axes of said inner joint part and of said outer joint part.

3. A joint according to claim 2, wherein when the joint is in the aligned condition, a plane (BB) intersects a rolling circle ($R_o$) of said balls approximately in the same point as a ray which is remote from a reference plane (YZ) by a contact angle ($\delta$), with the contact angle ($\delta$) being defined as the angle between effective lines of supporting forces at said ball and a radial ray through said ball in the cross-section through the aligned joint.

4. A joint according to any one of claim 2 or 3, wherein when the joint is in the aligned condition, the center lines of the outer and inner ball tracks associated with one another are identical circular arches with a common center ($M_1$).

5. A joint according to any one of claim 2, wherein when the joint is in the aligned condition, the center lines of the outer and inner ball tracks associated with one another, in a central region, each constitute circular arches whose centers ($M_3$) are axially offset in opposed directions relative to the central plane of the aligned joint and radially offset relative to the coinciding central axes of the inner joint part and of the outer joint part.

6. A joint according to claim 5, wherein the circular arches in a fourth region (IV) cover an angle of approximately 10 to 15 degrees which, at one end, is followed by a straight line in a third region (III) at an angle of approximately 6 to 8 degrees relative to the coinciding center lines, which in turn is followed by a circular arch in a first region (I) with a greater first radius ($R_{1I}$) and which, at the other end, is directly followed by a circular arch in a second region (II) with a greater second radius ($R_{1II}$).

7. A joint according to claim 6, wherein the two circular arches with the greater first and second radii ($R_{1I}$, $R_{1II}$) have a common center ($M_1$) in the central plane of the aligned joint.

8. A constant velocity universal ball joint of the fixed joint type, comprising:
an outer joint part with curved outer ball tracks extending longitudinally inside,
an inner joint part with curved inner ball tracks extending longitudinally outside,
a plurality of torque transmitting balls which are each guided in outer and inner ball tracks associated with one another,
a ball cage with a plurality of cage windows respectively receiving said balls, wherein the tangential planes at points of contact of said balls with said outer and inner ball tracks—said points of contact serving torque transmitting purposes—define a spatial angle (2K) and wherein the superposition of the momentary local relative speeds in said points of contact between said balls and said outer and inner ball tracks defines a rolling error ($\Delta v$),
said tracks are designed such that when the joint is in an articulated condition, minimum control angles (K) coincide with regions of minimum rolling errors ($\Delta v$), and
wherein when the joint is in an aligned condition, the center lines of the outer and inner ball tracks associated with one another are positioned in a radial plane (AA) through the coinciding central axes of the inner joint part and the outer joint part and comprise circular arches whose radius of curvature ($R_1$) is smaller than a rolling circle radius ($R_o$).

9. A joint according to claim 8, wherein the radius of curvature ($R_1$) amounts to approximately $R_o \cos^2 \delta$, wherein $R_o$ is the rolling contact radius and with a contact angle $\delta$ being the angle between the effective lines of the supporting forces at the ball and a radial ray through the ball in the cross-section through the aligned joint.

10. A joint according to claim 8, wherein the center lines of the outer and inner ball tracks associated with one another represent identical circular arches around a common center ($M_2$) positioned in the central plane of the aligned joint.

11. A joint according to claim 8, wherein the center lines of the outer and inner ball tracks associated with one another, in a central region (IV), each comprise circular arches whose centers ($M_3$) are axially offset in opposed directions relative to the central plane of the aligned joint and radially offset relative to the coinciding central axes.

12. A joint according to claim 11, wherein the circular arches in the fourth region (V) cover an angle of approximately 10 to 15 degrees which, at one end, is followed by a straight in a third region (III) at angle of approximately 6 to 8 degrees relative to the coinciding central axes, which, in turn, is followed by a first circular arch ($R_{1I}$) in a first region (I), and which, at the other end, is directly followed by a second circular arch ($R_{1II}$) in second region (II).

13. A joint according to claim 12, wherein the first and second circular arches ($R_{1I}$, $R_{1II}$) comprise centers which are positioned in the central plane of the aligned joint and which are each positioned at a distance from the coinciding central axes, which distance amounts to approximately $R_{1I} \sin^2\delta$ and $R_{1II} \sin^2\delta$ respectively with the contact angle $\delta$ being defined as the angle between the effective lines of the forces at the ball and a radial line through the ball in the cross-section through the aligned joint.

14. A joint according to any one of claims 6, 7, 12, or 13, wherein the center lines consisting of straight lines and circular arches are represented approximately by polynomial approximation.

15. A joint according to any one of claims 3 and 6–13, wherein the ball cage for compulsory control cooperates with a pilot lever which comprises articulation points on the central axis of the outer joint part and on the central axis of the inner joint part and which, by means of a control point positioned therebetween, acts on the ball cage.

16. A joint according to claim 1 wherein the ball cage for compulsory control cooperates with a pilot lever which comprises articulation points on the central axis of the outer joint part and on the central axis of the inner joint part and which, by means of a control point positioned therebetween, acts on the ball cage.

* * * * *

UNITED STATES PATENT AND TRADEMARK OFFICE
CERTIFICATE OF CORRECTION

PATENT NO. : 6,306,044 B1  Page 1 of 1
DATED : October 23, 2001
INVENTOR(S) : Schwarzler It is certified that error appears in the above-identified patent and that said Letters Patent is hereby corrected as shown below:

Column 7,
Line 17, after "points of contact" please insert the word -- serving --.

Signed and Sealed this

Second Day of July, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,306,044 B1
DATED : October 23, 2001
INVENTOR(S) : Schwarzler

It is certified that error appears in the above-identified patent and that said Letters Patent is hereby corrected as shown below:

Column 7,
Line 47, after "an" please delete the ",".

Column 8,
Line 34, please replace "(2K)" with -- (K) --.

Column 9,
Line 2, after "at" please insert -- an --.
Line 6, after "in" please insert -- a --.

Signed and Sealed this

Third Day of December, 2002

JAMES E. ROGAN
*Director of the United States Patent and Trademark Office*